US012596173B2

(12) United States Patent
Himmelstoss et al.

(10) Patent No.: US 12,596,173 B2
(45) Date of Patent: Apr. 7, 2026

(54) RADAR SENSOR DEVICE AND METHOD FOR SELF-TESTING

(71) Applicant: Robert Bosch GmbH, Stuttgart (DE)

(72) Inventors: Armin Himmelstoss, Weissach Im Tal (DE); Maik Hansen, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 400 days.

(21) Appl. No.: 18/325,973

(22) Filed: May 30, 2023

(65) Prior Publication Data

US 2024/0036157 A1 Feb. 1, 2024

(30) Foreign Application Priority Data

Jul. 28, 2022 (DE) ..................... 10 2022 207 803.9

(51) Int. Cl.
G01S 7/03 (2006.01)
G01S 7/40 (2006.01)
G01S 13/931 (2020.01)

(52) U.S. Cl.
CPC ............ G01S 7/032 (2013.01); G01S 7/4017 (2013.01); G01S 13/931 (2013.01)

(58) Field of Classification Search
CPC .......... G01S 7/4069; G01S 7/40; G01S 7/032; G01S 7/4017
USPC .................................. 342/165, 169, 174, 175
See application file for complete search history.

(56) References Cited

U.S. PATENT DOCUMENTS

| | | | | |
|---|---|---|---|---|
| 5,163,176 A | * | 11/1992 | Flumerfelt .......... | G01S 13/9092 342/174 |
| 5,412,414 A | * | 5/1995 | Ast ...................... | G01S 7/4017 342/372 |
| 5,619,143 A | * | 4/1997 | Stevens .................. | G01N 22/00 73/159 |
| 6,067,042 A | * | 5/2000 | Lee ...................... | G01S 7/4052 342/175 |
| 6,084,545 A | * | 7/2000 | Lier ...................... | H01Q 3/267 342/174 |
| 6,163,296 A | * | 12/2000 | Lier .......................... | G01S 3/14 342/417 |

(Continued)

FOREIGN PATENT DOCUMENTS

DE 102020117748 A1 1/2022

*Primary Examiner* — Michael W Justice
(74) *Attorney, Agent, or Firm* — NORTON ROSE FULBRIGHT US LLP

(57) ABSTRACT

A radar sensor device. The radar device includes a radar sensor for detecting an object using radar waves, a transmission path which transmits a transmission signal in the direction of the object and includes a transmission antenna, at least one receiving path which transmits a transmission signal reflected by the object as a reception signal and includes a receiving antenna and a test signal path which transmits a test signal for self-testing the radar sensor and extends at least between a first coupling point of the transmission path and a second coupling point of the receiving path. The first coupling point is disposed in the direction toward the object downstream of the transmission antenna or immediately upstream of the transmission antenna and the second coupling point is disposed in the direction coming from the object upstream of the receiving antenna or immediately downstream of the receiving antenna.

9 Claims, 4 Drawing Sheets

(56) References Cited

U.S. PATENT DOCUMENTS

| | | | | |
|---|---|---|---|---|
| 6,320,540 | B1 * | 11/2001 | Meredith | H01Q 3/26 342/174 |
| 6,445,343 | B1 * | 9/2002 | Pietrusiak | H01Q 25/007 342/368 |
| 6,480,153 | B1 * | 11/2002 | Jung | H01Q 3/267 342/368 |
| 6,720,919 | B1 * | 4/2004 | Sinsky | H01Q 3/267 342/368 |
| 6,778,130 | B1 * | 8/2004 | Bevan | G01S 5/12 342/174 |
| 6,809,685 | B2 * | 10/2004 | Hancock | H01Q 3/267 342/368 |
| 7,199,753 | B2 * | 4/2007 | Pauplis | H04B 17/20 342/368 |
| 7,495,599 | B2 * | 2/2009 | Andersson | G01S 7/024 342/175 |
| 7,528,767 | B2 * | 5/2009 | Walker | G01S 7/03 342/174 |
| 7,920,089 | B2 * | 4/2011 | Walker | G01S 7/4052 342/174 |
| 8,488,959 | B2 * | 7/2013 | Umnov | H04B 10/0775 398/16 |
| 9,547,072 | B2 * | 1/2017 | Beyer | G01S 7/4021 |
| 9,927,517 | B1 * | 3/2018 | Bennett | G01S 13/88 |
| 10,228,455 | B2 * | 3/2019 | Bennett | H04Q 9/00 |
| 10,234,542 | B2 * | 3/2019 | Subburaj | G01S 7/4004 |
| 10,598,767 | B2 * | 3/2020 | Subburaj | G01S 7/4004 |
| 10,649,081 | B2 * | 5/2020 | Rincon | G01S 13/9076 |
| 10,756,417 | B2 * | 8/2020 | Izadian | G01S 7/032 |
| 10,816,655 | B2 * | 10/2020 | Bharadwaj | G01S 7/4004 |
| 11,061,112 | B2 * | 7/2021 | Fischer | G01S 13/26 |
| 11,579,280 | B2 * | 2/2023 | Kurvathodil | G01S 13/02 |
| 11,579,284 | B2 * | 2/2023 | Bharadwaj | G01S 7/4056 |
| 11,789,116 | B2 * | 10/2023 | Valdes Garcia | G01S 7/40 342/174 |
| 11,828,871 | B2 * | 11/2023 | Schrattenecker | G01S 7/4069 |
| 11,914,069 | B2 * | 2/2024 | Fiore | G01S 7/4069 |
| 11,977,180 | B2 * | 5/2024 | Itkin | G01S 7/4021 |
| 2008/0012748 | A1 * | 1/2008 | Ahn | H01Q 3/267 342/21 |
| 2008/0198066 | A1 * | 8/2008 | Kang | H04L 25/0224 342/174 |
| 2008/0224921 | A1 * | 9/2008 | Walker | G01S 7/03 342/174 |
| 2009/0237296 | A1 * | 9/2009 | Walker | G01S 7/03 342/174 |
| 2012/0183305 | A1 * | 7/2012 | Umnov | H04B 10/0775 398/152 |
| 2014/0327570 | A1 * | 11/2014 | Beyer | G01S 7/4021 342/26 R |
| 2017/0090014 | A1 * | 3/2017 | Subburaj | G01S 7/4056 |
| 2018/0156906 | A1 * | 6/2018 | Bennett | G01S 13/04 |
| 2018/0156910 | A1 * | 6/2018 | Bharadwaj | G01S 13/4427 |
| 2019/0094338 | A1 * | 3/2019 | Fischer | G01S 13/003 |
| 2019/0101639 | A1 * | 4/2019 | Rincon | H01Q 21/065 |
| 2019/0148829 | A1 * | 5/2019 | Ananth | H04B 17/21 342/174 |
| 2019/0154797 | A1 * | 5/2019 | Subburaj | G01S 7/032 |
| 2019/0190133 | A1 * | 6/2019 | Izadian | H01Q 15/24 |
| 2020/0020850 | A1 * | 1/2020 | Dorrance | H04L 5/14 |
| 2020/0209353 | A1 * | 7/2020 | Subburaj | G01S 7/4004 |
| 2021/0026005 | A1 * | 1/2021 | Bharadwaj | G01S 13/9023 |
| 2021/0063534 | A1 * | 3/2021 | Shams | G01S 7/4052 |
| 2021/0181326 | A1 * | 6/2021 | Kurvathodil | G01S 13/931 |
| 2022/0003838 | A1 * | 1/2022 | Itkin | G01S 7/4021 |
| 2022/0196796 | A1 * | 6/2022 | Fiore | G01S 13/581 |
| 2022/0229155 | A1 * | 7/2022 | Schrattenecker | G01S 7/40 |
| 2023/0155671 | A1 * | 5/2023 | Harada | H04B 7/18519 455/9 |
| 2024/0145912 | A1 * | 5/2024 | Brillant | H04B 17/12 |

* cited by examiner

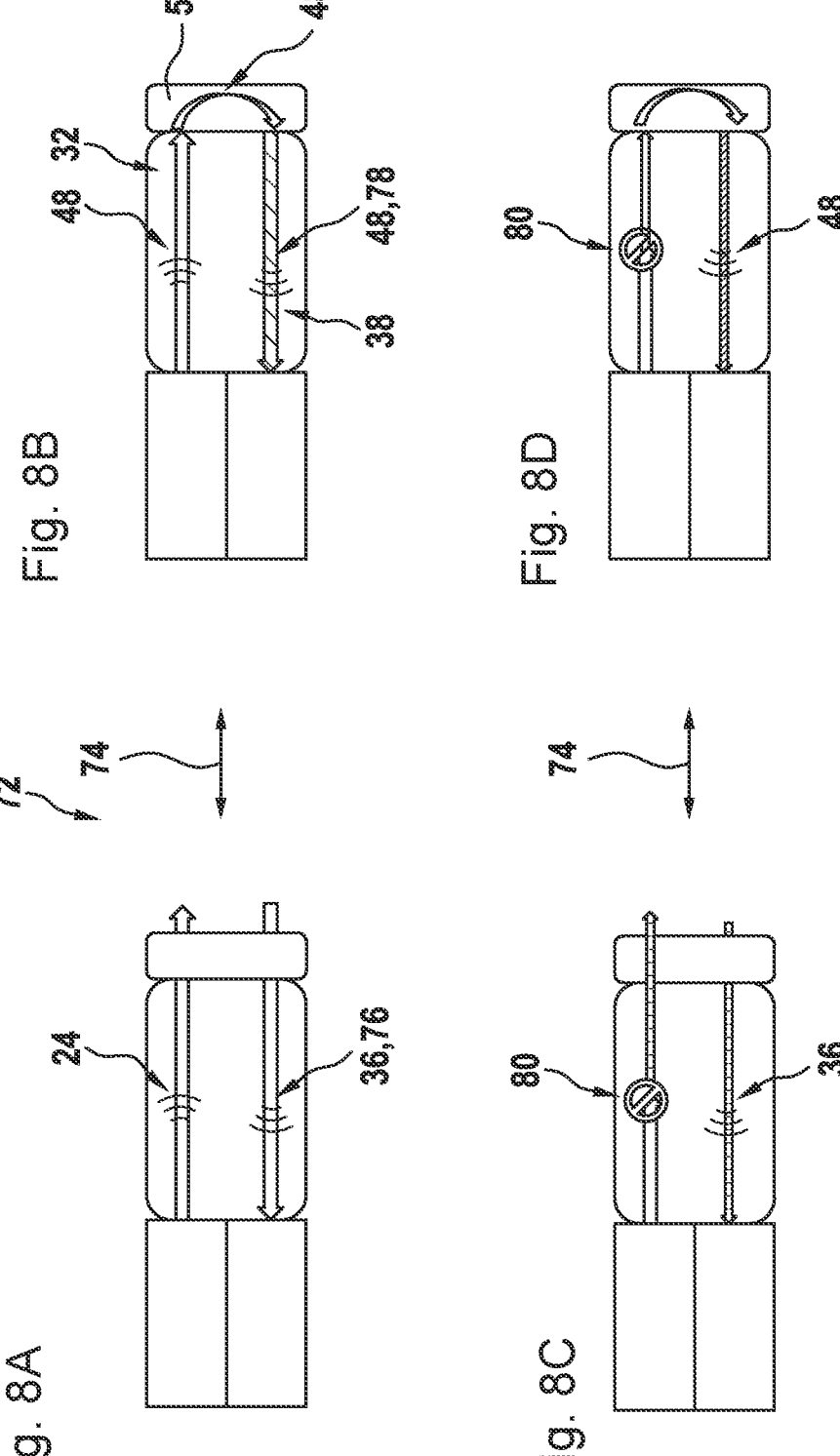

RADAR SENSOR DEVICE AND METHOD FOR SELF-TESTING

CROSS REFERENCE

The present application claims the benefit under 35 U.S.C. § 119 of German Patent Application No. DE 10 2022 207 803.9 filed on Jul. 28, 2022, which is expressly incorporated herein by reference in its entirety.

FIELD

The present invention relates to a radar sensor device. The present invention also relates to a method for self-testing a radar sensor device.

BACKGROUND INFORMATION

German Patent Application No. DE 10 2020 117 748 A1 describes a radar system with a monitoring function. The radar system includes a signal source which produces a high frequency signal, a modulator which produces a test signal, a transmission channel which produces a transmission signal, and a receiving channel which receives an antenna signal and the test signal to carry out a self-test of the radar system.

SUMMARY

According to the present invention, a radar sensor device is provided.

The present invention may make it possible to monitor a larger transmission range of the radar sensor device with the self-test. Possible contamination, in particular by solder balls or environmental factors, can be identified more effectively and in a larger detection range.

The radar sensor can be disposed in or on a vehicle, preferably a road vehicle, an aircraft, or a watercraft. The radar sensor can be suitable for partially autonomous or autonomous operation of the vehicle. The object detection of the object can be associated with a surroundings monitoring system of the vehicle. The object detection can be associated with a driver assistance system and/or a partially autonomous or autonomous driving system of the vehicle.

The object can be a living being, in particular a person, a building or another means of transport. The object can be a traffic infrastructure or a part of a traffic infrastructure, for example a road sign. The object can occur in an environment of the vehicle.

A self-test is preferably understood to be a test of a function, reliability, accuracy, or a comparable property of the radar sensor.

According to an example embodiment of the present invention, the radar sensor can acquire an object distance as a distance between the radar sensor and the object, an object speed as a relative speed of the object to the radar sensor, an azimuth angle and/or an elevation angle of the object in the detection field of the radar sensor.

The transmission signal, reception signal and/or test signal is preferably a high frequency signal.

The transmission path can comprise at least one waveguide. The receiving path can comprise at least one waveguide. The waveguide can at least partly be embodied as a hollow conductor. At least one of the waveguides can be implemented in a waveguide element. The waveguide element can be a waveguide antenna.

The transmission antenna means can be implemented as a transmission antenna. The receiving antenna means can be implemented as a receiving antenna. Transmitting can be transmitting into a surroundings of the waveguide element. Receiving can be receiving from a surroundings of the waveguide element.

According to an example embodiment of the present invention, the transmission signal can be produced by a high frequency component. The test signal can be produced by a high frequency component, preferably by the high frequency component that also produces the transmission signal. The test signal can be superimposed on the transmission signal and enable passive self-testing.

According to an example embodiment of the present invention, the test signal can be produced and/or transmitted in parallel with the transmission signal and enable active self-testing. The test signal can be produced independently of the transmission signal by a test signal element. The test signal element can switch the test signal on or off. The test signal element can set a polarity, frequency, phase, amplitude and/or modulation of the test signal. The test signal element can produce a modulated test signal. The test signal element can be implemented as an active tag. The test signal element can be set by a controller. The test signal element can be a MMIC (monolithic microwave integrated circuit) and/or SoC (system-on-chip).

A frequency of the test signal can be the same as or different from a frequency of the transmission signal. The test signal path can comprise frequency filter means for frequency-selective passage of the test signal. The transmission antenna means can comprise frequency filter means for frequency-selective passage of the transmission signal. The frequency of the test signal can be outside an operating range of the radar sensor.

The test signal can have a field wave type different from the transmission signal.

In a preferred embodiment of the present invention, it may be advantageous if the test signal has a first polarity and the transmission signal has a second polarity different from the first polarity. The first polarity can be perpendicular to the second polarity. This makes it possible to separate the test signal from the transmission signal more easily and reliably.

In a special embodiment of the present invention, it may be advantageous if the test signal path comprises polarity-dependent transmission means which allow transmission of the test signal having the first polarity via the test signal path and block transmission of the transmission signal having the second polarity via the test signal path. The test signal can thus be transmitted as a function of the first and second polarity. The transmission means can be implemented as a film. The transmission means can comprise at least one polarization film.

In one advantageous embodiment of the present invention, it may be provided that the test signal and the transmission signal originate from a common signal source. The signal source can be the high frequency component or an antenna, in particular a dipole antenna, or a quarter-wave structure. The signal source can produce the first and/or second polarity using the Van Atta principle, an EBG (electromagnetic band-gap) structure or other polarization structures, in particular filters.

In a special embodiment of the present invention, it may be advantageous if the first and/or second coupling point is disposed inside the radar sensor. This makes it possible to self-test a region inside the radar sensor. The first and/or second coupling point can be disposed inside the waveguide element.

In a preferred embodiment of the present invention, it may be provided that the test signal path is embodied at least partly as a waveguide having a hollow conductor design for transmitting the test signal. The test signal path can comprise a delay path for phase shifting the test signal. The waveguide can comprise the delay path.

An advantageous preferred embodiment of the present invention is one in which the test signal path extends at least partly in a protective sheath of the radar sensor. The protective sheath can be a radar dome (radome) of the radar sensor.

In a preferred embodiment of the present invention, it is advantageous if the first and/or second coupling point is disposed outside the radar sensor. The self-test can thus also include a transmission range outside the radar sensor.

In a special embodiment of the present invention, it is provided that the radar sensor is disposed in a vehicle and the test signal path extends at least partly to a cladding element of the vehicle. The first and/or second coupling point can be disposed in the cladding element of the vehicle. The cladding element can be an interior cladding or a body cladding, in particular a bumper.

The self-testing can include a test region between the high frequency component and the protective sheath. The test region can extend to the cladding element. The test signal path can extend between the high frequency component and a vehicle interior, in particular the protective sheath or a radiating region of an antenna, or between the high frequency component and an outer region of the vehicle, in particular an outer surface of the vehicle.

An advantageous preferred embodiment of the present invention is one in which the test signal path comprises a further transmission antenna means which is active in parallel with the transmission antenna means for transmitting the test signal and/or a further receiving antenna means which is active in parallel with the receiving antenna means for receiving the test signal from the radar sensor. The test signal can thus be produced or processed independently of the transmission signal and/or the reception signal.

According to the present invention, a method for self-testing is provided as well. If the reception signal corresponds to a predefined reference signal and the received test signal corresponds to a predefined test reference signal, a disturbance of the signal transmission can be ruled out. If there is a deviation between the reception signal and the reference signal and the received test signal and the test reference signal, a disturbance of the signal transmission can be inferred. The effect of the disturbance can be a function of a deviation from the reference signal and/or test reference signal.

The self-test can be carried out during a normal operation for object detection or separate from a normal operation of the radar sensor device.

Further advantages and advantageous embodiments of the present invention will emerge from the description of the figures and the figures.

BRIEF DESCRIPTION OF THE DRAWINGS

The present invention is described in detail in the following with reference to the figures.

FIGS. 8A-8D show a method for self-testing in a further special embodiment of the present invention.

DETAILED DESCRIPTION OF EXAMPLE EMBODIMENTS

Figure 1:
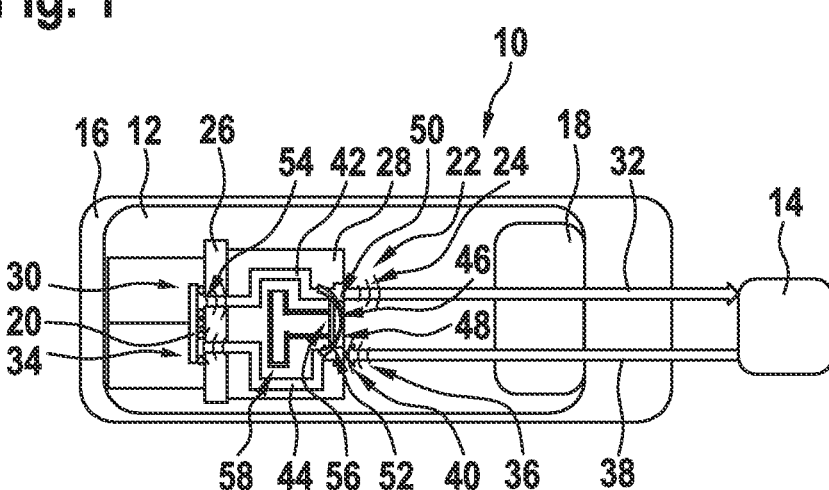
FIG. 1 shows a radar sensor device in a special embodiment of the present invention.

FIG. 1 shows a radar sensor device in a special embodiment of the present invention. The radar sensor device 10 comprises a radar sensor 12 for detecting an object 14 by means of radar waves. The radar sensor 12 is preferably disposed on a vehicle 16, here for example a motor vehicle, and is protected from external weather effects and loads by a protective sheath 18. The protective sheath 18 is embodied as a radar dome (radome). The object can be present in a surroundings of the vehicle 16 and can be detected by the radar sensor 12.

The radar sensor 12 comprises a high frequency component 20 for producing a high frequency signal on which a transmission signal 24 transmitted by a transmission antenna means 22 of the radar sensor 12 is based. The high frequency component 20 can be an MMIC and/or a SoC disposed on a carrier plate 26 (PCB). The carrier plate 26 accommodates a waveguide element 28.

The radar sensor device 10 comprises a transmitting device 30 connected to a transmission path 32 which transmits the transmission signal 24 in the direction of the object 14 and a receiving device 34 connected to a receiving path 38 which transmits a transmission signal 24 reflected by the object 14 as a reception signal 36 and comprises a receiving antenna means 40 of the radar sensor 12 for receiving the reception signal 36. The high frequency component 20 comprises the transmitting device 30 and the receiving device 34. The transmission antenna means 22 and the receiving antenna means 40 are disposed on the waveguide element 28 on the side facing the surroundings. The waveguide element 28 comprises waveguides which are embodied as hollow conductors; on the one hand a waveguide 42 for transmitting the transmission signal 24 between the high frequency component 20 and the transmission antenna means 22, and another waveguide 44 for transmitting the reception signal 36 between the high frequency component 20 or another high frequency component and the receiving antenna means 40.

The radar sensor device 10 comprises a test signal path 46 which transmits a test signal 48 for self-testing the radar sensor 12 and extends between a first coupling point 50 of the transmission path 32 and a second coupling point 52 of the receiving path 38. The first coupling point 50 is disposed in the direction toward the object 14 immediately upstream of the transmission antenna means 22 and the second coupling point 52 is disposed in the direction coming from the object 14 immediately downstream of the receiving antenna means 40. The first and the second coupling point 50, 52 are disposed inside the radar sensor 12 in the waveguide element 28.

The test signal 48 and the transmission signal 24 originate from a common signal source 54, here the high frequency component 20. The test signal 48 is superimposed on the transmission signal 24. The test signal 48 has a first polarity and transmission signal 24 has a second polarity different from the first polarity. The first polarity is in particular perpendicular to the second polarity, which makes it easier to separate the signals from one another.

The test signal path 46 comprises polarity-dependent transmission means 56 which allow transmission of the test signal 48 having the first polarity and block transmission of the transmission signal 24 having the second polarity via the test signal path 46. The test signal 48 can thus be selectively transmitted via the test signal path 46.

The test signal path 46 can alternatively or additionally comprise a delay path 58 for phase shifting the test signal 48. The waveguide 42 in particular comprises the delay path 58.

Figure 2:
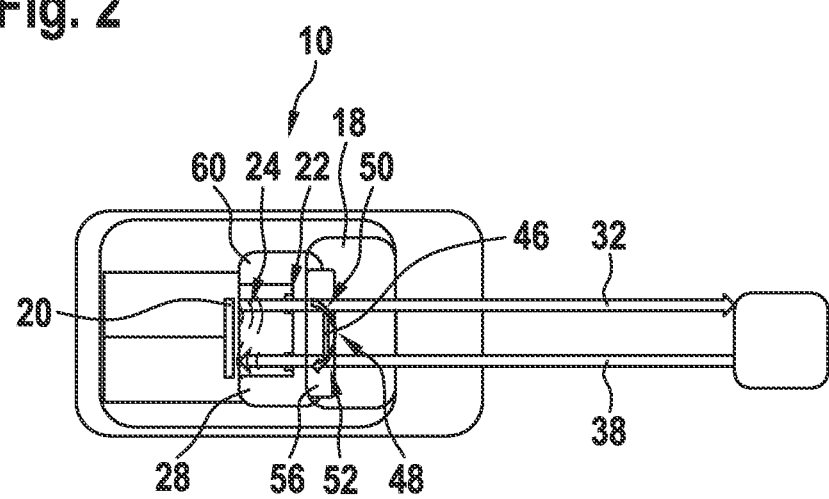
FIGS. 2 to 7 show a radar sensor device in a respective further special embodiment of the present invention.

FIGS. 2 to 7 show a radar sensor device in a respective further special embodiment of the present invention. The radar sensor device 10 in FIG. 2 is constructed in the same way as that of FIG. 1 except for the following differences. The transmission signal 24 with the superimposed test signal 48 is output via the transmission antenna means 22 as the transmission antenna. The protective sheath 18 comprises the polarity-dependent transmission means 56 which allow transmission of the test signal 48 having the first polarity and block transmission of the transmission signal 24 having the second polarity via the test signal path 46. The test signal 48 thus reaches the receiving path 38 via the transmission path 32 and the transmission means 56. The first and the second coupling point 50, 52 are located outside the waveguide element 28 and in the protective sheath 18 of the radar sensor 12. The self-testing covers the test region 60 between the high frequency component 20 and the protective sheath 18.

Figure 3:
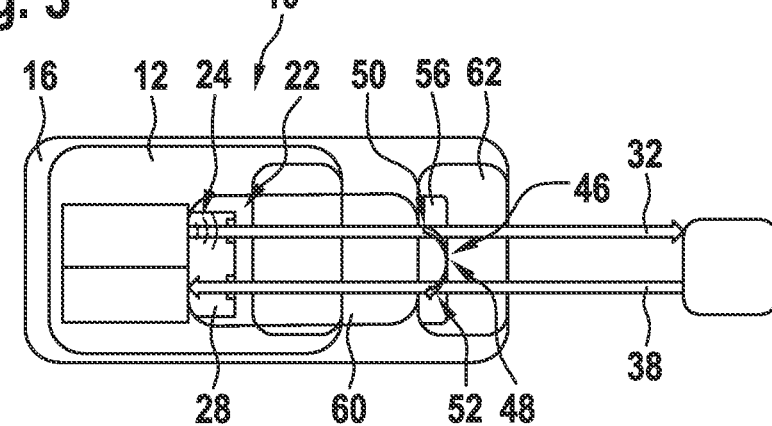

The radar sensor device 10 in FIG. 3 is constructed in the same way as that of FIG. 1 except for the following differences. The transmission signal 24 with the superimposed test signal 48 is output via the transmission antenna means 22 as the transmission antenna. A cladding element 62 of the vehicle 16 comprises the polarity-dependent transmission means 56 which allow transmission of the test signal 48 having the first polarity and block transmission of the transmission signal 24 having the second polarity via the test signal path 46. The test signal 48 thus reaches the receiving path 38 via the transmission path 32 and the transmission means 56. The first and the second coupling point 50, 52 are located outside the waveguide element 28 and outside the radar sensor 12. The test region 60 extends to the cladding element 62.

Figure 4:
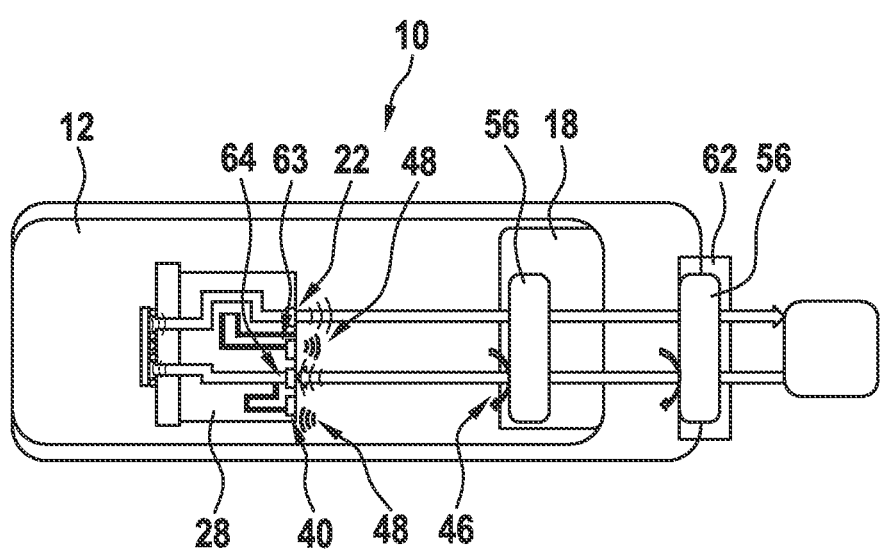

The radar sensor device 10 in FIG. 4 is constructed in the same way as that of FIG. 1 except for the following differences. The test signal path 46 comprises a further transmission antenna means 63 which is active in parallel with the transmission antenna means 22 for transmitting the test signal 48 from the waveguide element 28 and a further receiving antenna means 64 which is active in parallel with the receiving antenna means 40 for receiving the test signal 48 in the waveguide element 28. The polarity-dependent transmission means 56 can be disposed in the protective sheath 18 of the radar sensor 12 and/or in the cladding element 62.

Figure 5:
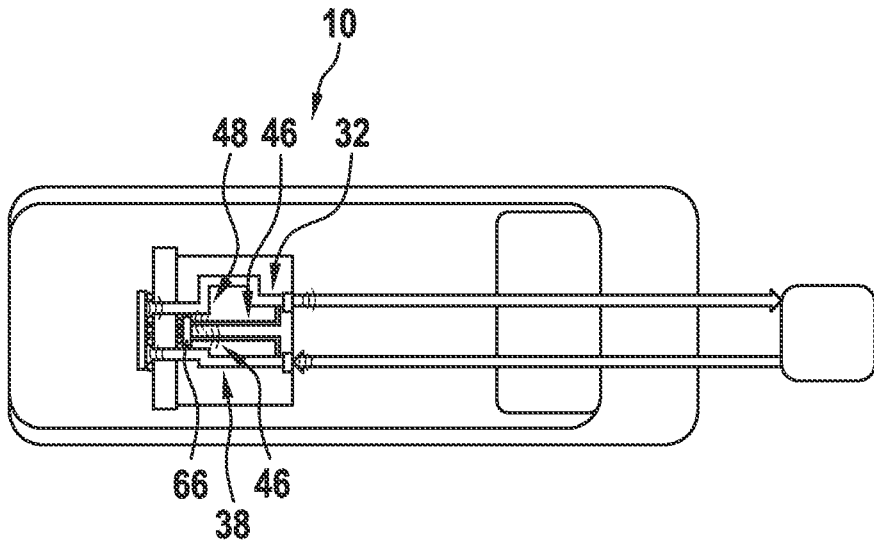

The radar sensor device 10 in FIG. 5 is constructed in the same way as that of FIG. 1 except for the following differences. The test signal 48 is transmitted by the transmission path 32 via the test signal path 46 to a test signal element 66 and from the test signal element 66 or another test signal element 66 to the receiving path 38. This allows active self-testing to be carried out. The test signal element 66 can be implemented as an active tag. The design of the transmission path 32 or the receiving path 38 can thus be independent of polarity.

Figure 6:
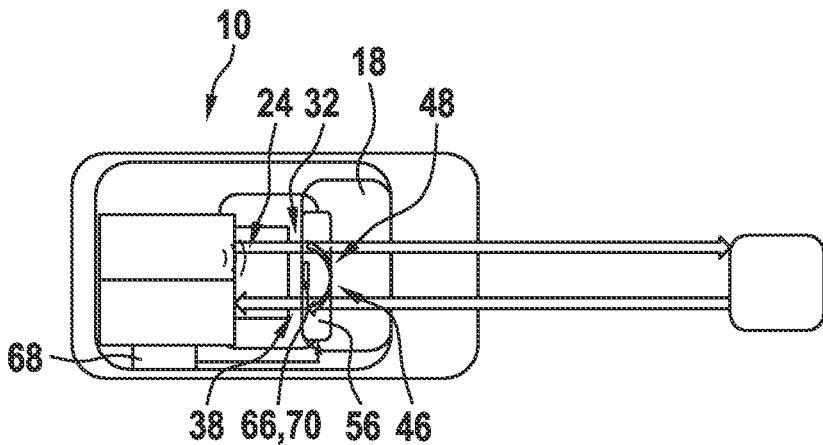

The radar sensor device 10 in FIG. 6 is constructed in the same way as that of FIG. 2 except for the following differences. The test signal 48 is transmitted from the transmission path 32 to the receiving path 38 via the test signal path 46 by a test signal element 66 which is set by means of a controller 68. The test signal element 66 is disposed in the protective sheath 18. The test signal element

66 can be an actively polarizing reflector 70, which transmits the test signal 48 that originates with the transmission signal 24 and has the first polarity different from the second polarity of transmission signal 24 between the transmission path 32 and the receiving path 38 via the test signal element 66 which forms or controls the active transmission means 56. The test signal 48 can also have a frequency that differs from the transmission signal 24, is filtered via the test signal element 66 and transmitted via the test signal path 46. The test signal 48 can alternatively or additionally be modulated.

Figure 7:
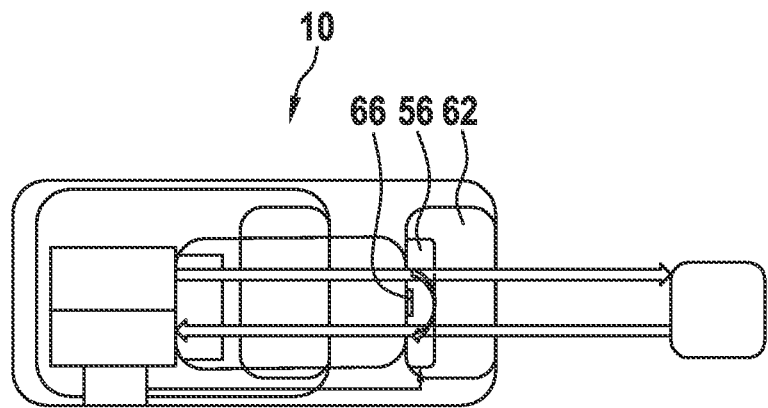

The radar sensor device 10 in FIG. 7 is constructed in the same way as that of FIG. 6 except for the following differences. The test signal element 66 and the transmission means 56 are disposed in the cladding element 62.

FIGS. 8A-8D show a method for self-testing 72 in a further special embodiment of the present invention. FIGS. 8A and 8B show the two signal transmissions when there is no disturbance in the transmission paths and FIGS. 8C and 8D show the two signal transmissions when there is a disturbance in the transmission paths.

The method for self-testing 72 includes evaluating the test signal 48 by creating a signal relationship 74 between the reception signal 36 which, as shown in FIG. 8A, is dependent on the transmission signal 24 and is acquired in advance as a reference signal 76 and, as shown in FIG. 8B, the received test signal 48, which is transmitted between transmission path 32 and the receiving path 38 via the transmission means 56 and is acquired in advance as the test reference signal 78.

As illustrated in FIG. 8C, when a disturbance 80 is present, the reception signal 36 is weakened by the disturbance 80 and therefore differs from the reference signal 76 of FIG. 8A. Moreover, as illustrated in FIG. 8D, the received test signal 48 is weakened relative to the test reference signal 78 of FIG. 8B. Therefore, in the presence of a disturbance 80, the signal relationship 74 between the reception signal 36 and the received test signal 48 differs from the signal relationship 74 between the reference signal 76 and the test reference signal 78. The disturbance 80 can thus be detected as a function of the signal relationship 74, and the effect of the disturbance 80 can be calculated.

What is claimed is:

1. A radar sensor device, comprising:
   a radar sensor configured to detect an object using radar waves;
   a transmission path which transmits a transmission signal in a direction of the object and includes a transmission antenna of the radar sensor configured to transmit the transmission signal;
   at least one receiving path which transmits a transmission signal reflected by the object as a reception signal and includes a receiving antenna of the radar sensor configured to receive the reception signal; and
   a test signal path which transmits a test signal for self-testing the radar sensor and extends at least between a first coupling point of the transmission path and a second coupling point of the receiving path, wherein the test signal has a first polarity and the transmission signal has a second polarity different from the first polarity, wherein the test signal path includes a polarity-dependent transmission arrangement which allows transmission of the test signal having the first polarity via the test signal path and blocks transmission of the transmission signal having the second polarity via the test signal path;
   wherein the first coupling point is disposed in the direction toward the object downstream of the transmission antenna or immediately upstream of the transmission antenna, and the second coupling point is disposed in a direction coming from the object upstream of the receiving antenna or immediately downstream of the receiving antenna.

2. The radar sensor device according to claim 1, wherein the test signal and the transmission signal originate from a common signal source.

3. The radar sensor device according to claim 1, wherein the first and/or second coupling point is disposed inside the radar sensor.

4. The radar sensor device according to claim 1, wherein the test signal path is embodied at least partly as a waveguide having a hollow conductor design for transmitting the test signal.

5. The radar sensor device according to claim 1, wherein the test signal path extends at least partly in a protective sheath of the radar sensor.

6. The radar sensor device according to claim 1, wherein the first and/or second coupling point is disposed outside the radar sensor.

7. The radar sensor device according to claim 1, wherein the radar sensor is disposed in a vehicle and the test signal path extends at least partly to a cladding element of the vehicle.

8. The radar sensor device according to claim 1, wherein the test signal path includes: i) a further transmission antenna which is active in parallel with the transmission antenna configured to transmit the test signal, and/or ii) a further receiving antenna which is active in parallel with the receiving antenna configured to receive the test signal from the radar sensor.

9. A method for self-testing a radar sensor device, the radar sensor device including:

a radar sensor configured to detect an object using radar waves, a transmission path which transmits a transmission signal in a direction of the object and includes a transmission antenna of the radar sensor configured to transmit the transmission signal, at least one receiving path which transmits a transmission signal reflected by the object as a reception signal and includes a receiving antenna of the radar sensor configured to receive the reception signal, and a test signal path which transmits a test signal for self-testing the radar sensor and extends at least between a first coupling point of the transmission path and a second coupling point of the receiving path, wherein the test signal has a first polarity and the transmission signal has a second polarity different from the first polarity, wherein the test signal path includes a polarity-dependent transmission arrangement which allows transmission of the test signal having the first polarity via the test signal path and blocks transmission of the transmission signal having the second polarity via the test signal path, wherein the first coupling point is disposed in the direction toward the object downstream of the transmission antenna or immediately upstream of the transmission antenna, and the second coupling point is disposed in a direction coming from the object upstream of the receiving antenna or immediately downstream of the receiving antenna, the method comprising the following steps:

evaluating the test signal by determining a signal relationship between the reception signal and the received test signal; and detecting a disturbance of the signal transmission as a function of the signal relationship.

* * * * *